United States Patent
O'Brien

(10) Patent No.: US 8,377,165 B2
(45) Date of Patent: Feb. 19, 2013

(54) RECOVERY OF ELEMENTS FROM HYDROTHERMAL PRODUCTS

(75) Inventor: Thomas B. O'Brien, Kailua-Kona, HI (US)

(73) Assignee: Shale and Sands Oil Recovery LLC, St.Augustine, FL (US)

( * ) Notice: Subject to any disclaimer, the term of this patent is extended or adjusted under 35 U.S.C. 154(b) by 0 days.

(21) Appl. No.: 13/360,210

(22) Filed: Jan. 27, 2012

(65) Prior Publication Data

US 2012/0125153 A1    May 24, 2012

Related U.S. Application Data

(60) Provisional application No. 61/437,231, filed on Jan. 28, 2011.

(51) Int. Cl.
- *C22B 59/00* (2006.01)
- *C02F 1/48* (2006.01)
- *B03C 1/30* (2006.01)

(52) U.S. Cl. ...... 75/10.67; 75/711; 210/695; 210/748.01

(58) Field of Classification Search .............. 75/711, 75/10.67; 210/695, 748.01
See application file for complete search history.

(56) References Cited

U.S. PATENT DOCUMENTS

| | | | |
|---|---|---|---|
| 3,898,020 A | 8/1975 | Matthews | |
| 3,905,196 A | 9/1975 | Govindarajan | |
| 3,908,380 A | 9/1975 | Lobach | |
| 4,127,989 A * | 12/1978 | Mickelson | 60/641.2 |
| 4,142,108 A | 2/1979 | Matthews | |
| 4,224,151 A * | 9/1980 | Jost | 210/696 |
| 4,602,820 A * | 7/1986 | Hard | 299/5 |
| 4,718,236 A * | 1/1988 | Awerbuch et al. | 60/641.5 |
| 4,876,206 A | 10/1989 | Sayer | |
| 5,240,687 A * | 8/1993 | Gallup et al. | 423/42 |
| 5,593,378 A * | 1/1997 | Dyck | 494/55 |

FOREIGN PATENT DOCUMENTS

JP   2003320370 A  * 11/2003

* cited by examiner

*Primary Examiner* — George Wyszomierski
*Assistant Examiner* — Tima M McGuthry Banks
(74) *Attorney, Agent, or Firm* — Mark S. Leonardo; Brown Rudnick LLP

(57) ABSTRACT

The invention generally relates to the extraction of rare earth elements and heavy metals from geothermal fluids used in geothermal electrical production. The invention provides systems and methods for extracting these elements from hydrothermal products by the application of one or more forces that affect different components of a condensate differently.

14 Claims, 3 Drawing Sheets

RECOVERY OF ELEMENTS FROM HYDROTHERMAL PRODUCTS

CROSS REFERENCE TO RELATED APPLICATION

This patent application claims the benefit of U.S. Provisional Patent Application Ser. No. 61/437,231, filed on Jan. 28, 2011, and titled A METHOD FOR EXTRACTING RARE EARTH ELEMENTS FROM CONDENSATES AND/OR PRECIPITATES GENERATED BY THE PROCESS OF GEOTHERMAL POWER PRODUCTION, the content of which being incorporated herein by reference in its entirety.

FIELD OF THE INVENTION

The invention generally relates to the extraction of rare earth elements and heavy metals from geothermal fluids used in geothermal electrical production.

BACKGROUND

In a binary geothermal electric production facility, the hot water or steam is passed through a heat exchanger, where it heats a second liquid—such as isobutane—in a closed loop. The isobutane boils at a lower temperature than water, so it is more easily converted into steam to run the turbine generator. One of the most problematic issues facing hydrothermal energy production is the precipitation of mineral elements during the cooling process. This extraction of heat from hot hydrothermal fluids or steam (i.e., cooling and transfer of heat), often results in precipitation of substances which clog the system. Heat exchangers, by their very nature, call for high physical exposure of metal tubing to the geothermal hot water and steam which can be easily clogged by such precipitates, causing downtime, unreliability, and higher cost of capital due to this inherent and oftentimes unpredictable nature of transformation.

Hot geothermal gases of either mesothermal or epithermal origin contain REEs and HEs. REEs predominantly occupy the Lanthanide or Actinide series of the Periodic Table of Elements, and are present, to some degree, in hot geothermal hot water and steam used to generate electricity. HEs are many of the transition elements of the periodic table and some metalloids. Many of these trace elements are essential, even in small amounts, as catalysts, in electronics and other applications. The literature indicates that the global markets are running low on REEs and HEs and rare elements of all types.

Known methods for separating REEs from other components utilize horizontally mounted drums with a magnetic field. A belt is placed over the drum and the level of paramagnetic susceptibility of various REEs and HEs provide that various REEs and HEs drop from the belt purely from the normal force of gravity as the belt passes over the magnetic drum, the more paramagnetic elements holding to the belt as the belt passes away from the magnetic drum thus causing separation by paramagnetic properties. In another technology, the subject particles are deposited directly on the magnetic drum and a similar separation process occurs.

A major drawback of these technologies is the magnet also collects dust which causes the process to be very expensive including the need to remove dust prior to the use of these technologies. A drawback using the belt-based technology is that the belts need to be frequently replaced meaning that the cost of replacement raises the cost of operation by more than 50% over non-belt-based applications.

SUMMARY

The present invention relates to the method and system for enhancing the value of geothermal electric production through separation and collection of rare earth elements ("REE") and heavy metals ("HE") that have economic value from the geothermal hot water or steam flow. Those REEs and HEs can be sold as byproducts of production increasing the revenue realized by the facility.

The present invention provides a method for extracting intrinsic REEs and HEs from the geothermal energy production process. The extraction and sale, driven by revenue growth, will inherently lower the cost of capital, and in many cases may render otherwise uneconomic projects economic.

The benefits of the methods described herein are manifold. First, the methods of the present invention will substantially reduce the overall cost of geothermal energy production which should yield great benefits to U.S. energy output. In addition, since geothermal electric production generally displaces fossil fuel generation, the emissions of greenhouse gasses will be reduced. Second, they will render a lower cost of capital due to, but not limited to, reduced investment risk. Third, they may limit or eliminate the need for of taxpayer expenditures to produce the concept of standalone profitability for geothermal electric production.

In certain aspects, the invention provides a method for extracting elements from hydrothermal products. Hydrothermal products generally include hot fluids from underground. Fluids generally include liquids and gases. Most hydrothermal products are predominantly water, with one or more dissolved or suspended substances therein.

These hydrothermal products are received from the earth at geothermal power plants, typically into a vessel. The vessel is sometimes a heat exchanger, although other vessels may be used for storage or as a conduit to a heat exchanger. Hot hydrothermal fluid generally cools in the vessel, particularly where the vessel is a heat exchanger and the thermal energy is purposefully drawn from the fluid into a secondary fluid.

As the hot fluid cools, materials condensate out of the fluid, producing condensates. These condensates are transferred to an extraction unit via a conduit element. The conduit element can be a conveyor belt, pipe, a trap door and gravity, a scraper, a tub, or any other means known in the art. Conveying the condensate to the extraction unit can be mechanized to happen automatically (i.e., without human intervention).

The extraction unit generally operates by the application of one or more forces that affect different components of the condensate differently. In certain embodiments, a first force is applied by accelerating the condensate. A second force can be applied by applying a magnetic force to the condensate. Accelerating the condensate can be done with gravity or a rotating body, such as a drum or centrifuge.

Because some components of the condensate will be affected differently by combinations of magnetic and physical forces than others, this combination of forces will physically segregate the components. As a result, one or more REEs will be physically segregated from other components. A segregated REE can be collected and removed from the condensate and from the vessel.

Segregation of the REEs from other components of the condensates can be optimized by varying the duration, intensity, timing, and constancy of the two forces. For example, either can be modulated so that the scalar amount of the force varies (regularly or irregularly) over time. The forces can be applied exactly simultaneously, or either one beginning first and/or either one terminating last.

In certain embodiments, a sample of the condensate or the geothermal fluid is separately analyzed to determine whether and in what amount any REEs may be present. The sample can be analyzed in a mass spectrometer or chromatograph unit. From this information, an optimal extraction method can be planned and performed.

In certain aspects, the invention provides a system for extracting elements from a hydrothermal fluid. Exemplary systems include a heat exchanger vessel configured to contain a hydrothermal fluid and an extraction unit operably connected to the heat exchanger vessel by a conduit element thereby to receive a precipitate from the hydrothermal fluid. The extraction unit can be configured to physically segregate elements from other components of the hydrothermal fluid. The system preferably further includes a turbine coupled to the heat exchanger by a secondary loop and configured to operate an electrical generator. In some embodiments, the extraction unit comprises a drum configured to operate as a centrifuge and optionally a magnet, which can be at the center of the drum.

In some embodiments, systems of the invention include a sampling and analysis unit configured to analyze a sample of the precipitate to identify the presence or amount of an element. Systems of the invention can further include one or more computers configured to operate or coordinate the operations of any other of the systems, devices, and methods of the invention. Typically, a computer includes a memory, a processor, and an input/output means (e.g., monitor, keyboard, and mouse; or touchscreen), configured to execute instructions stored on a tangible computer-readable medium. Exemplary systems of the invention further include communication networks such as a LAN, the Internet, or 3G or 4G networks by which one or more computers or devices of the invention may be configured to interoperate. Exemplary computer devices include one or more of a desktop PC, laptop, tablet, smartphone, and server/client terminal, or any combination thereof.

Preferably, systems of the invention include an extraction unit in which a centrifuge is configured to apply a centrifugal force to a condensate and a magnet is configured to apply a magnetic force to the condensate, the magnetic force being applied in a different direction as the centrifugal force.

BRIEF DESCRIPTION OF THE DRAWINGS

The present invention, both as to its organization and manner of operation, will be more fully understood from the following detailed description of illustrative embodiments taken in conjunction with the accompanying drawings in which.

DETAILED DESCRIPTION

Figure 1:
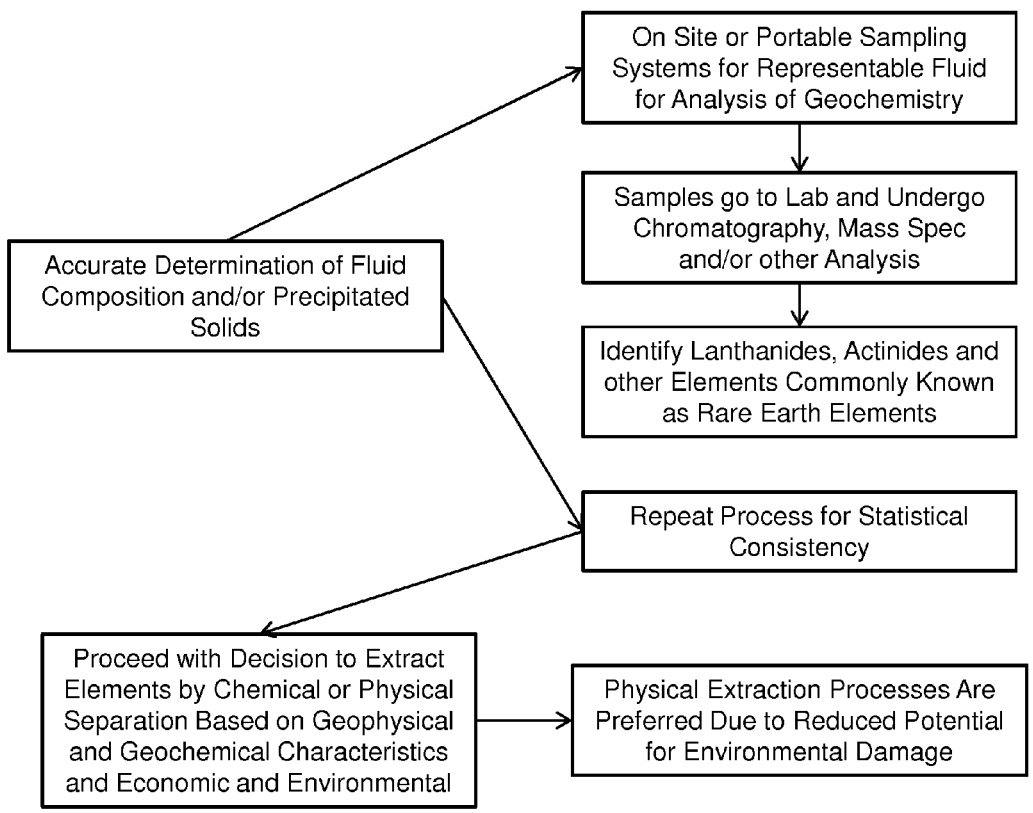
FIG. 1 is a schematic diagram of a method and system for utilizing the geothermal hot water and steam flows in a geothermal electric power plant to co-produce REEs and HEs.

The methods of the invention involve the steps of gathering one or more fluid or gaseous samples and/or precipitates (e.g., condensates) from a geothermal energy production process, analyzing the fluid samples/precipitates to identify one or more trace elements (e.g., REEs) present in the sample(s), assessing an optimal recovery/extraction method, and recovering/extracting the one or more trace elements from the sample(s).

The fluid sample(s) and/or precipitate(s) can be analyzed by "shooting" a solution of a given condensate through a measurement instrument such as a mass spectrometer in order to identify one or more trace elements, and to some degree their concentration. The skilled artisan will recognize that the outcomes will vary, depending on the geologic environment from which the samples are derived. The recovery/extraction system can be tailored once the one or more trace element are identified. For example, if it is determined that specific REEs and their relative concentrations, are present in the sample(s), then a determination of the optimal extraction method can be assessed using a cost-benefit approach. Factors to consider include, but are not limited to are pricing, availability and optimizing equipment for maximizing revenue. The difference between production and consumption of REEs illustrates a unique feature of the REE market—consumption is stronger for some specific REEs than for others. As a result a method for extraction and separation of various REEs is essential to maximizing the revenues of geothermal electric production projects. Conventional large-volume applications for bulk REEs are declining, thus lowering prices, while special, relatively small-volume REE applications are showing vigorous growth and correspondingly higher prices.

Accordingly, a method and system is disclosed for the extraction and separation of REEs and HEs from the operation of geothermal electric production facilities.

An embodiment of this invention includes a drum that is mounted vertically rather than horizontally. The magnet is placed in the center and the drum spins using the centrifugal force to force the REEs and HEs to the outside wall of the drum through centrifugal force which is more controllable than pure normal gravity. The separation process can be enhanced by varying the speed of rotation and the magnetic field and take advantage of the differing masses of the REEs and HEs and the differing paramagnetic properties of the REEs and HEs. Existing technologies are incapable of performing these actions.

The invention generally provides methods for extracting elements from geothermal or hydrothermal power plant systems. In such plant systems, thermal energy in sub-surface water is transferred via a heat exchanger into a second liquid. Geothermal energy conversion systems are described in U.S. Pat. No. 4,142,108, U.S. Pat. No. 3,898,020, U.S. Pat. No. 3,908,380, and U.S. Pat. No. 3,905,196. The hot fluids used in such systems contain solutes generally containing rare earth elements (REEs). A system according to the invention is generally located at a power plant. A plant, generally, is a site or location, such as a contiguous piece of property or single area.

These REEs are either susceptible or are strongly paramagnetic (i.e., subject to magnetization). This property can be utilized to extract REEs from condensates or from hot geothermal gases, water or solids. For example, without limitation, one method for recovering/extracting trace elements (e.g., REEs) from condensates produced by hot geothermal water or gases includes centrifugation using a permanent or electro magnet.

Before determining the efficacy of using separation technologies at a site that is in operation or is proposed to be a geothermal electric power plant, sampling must be undertaken to determine the viability of deriving economic extraction and separation of REEs and HEs. FIG. 1 illustrates this process. First, on site or portable sampling systems are used to extract representable fluid or solids for analysis of geochemistry. Then samples go to lab and undergo chromatography, mass spectrographic analysis and/or other analysis to identify lanthanides, actinides and other elements commonly known as REEs, HEs and other rare elements.

In some embodiments, REEs are detected by the use of chemical reaction means including, for example, mixing with sodium hydroxide, treating with hydrochloric acid, and examining under shortwave ultraviolet light. Detection of REEs is described in U.S. Pat. No. 4,876,206.

Figure 2:
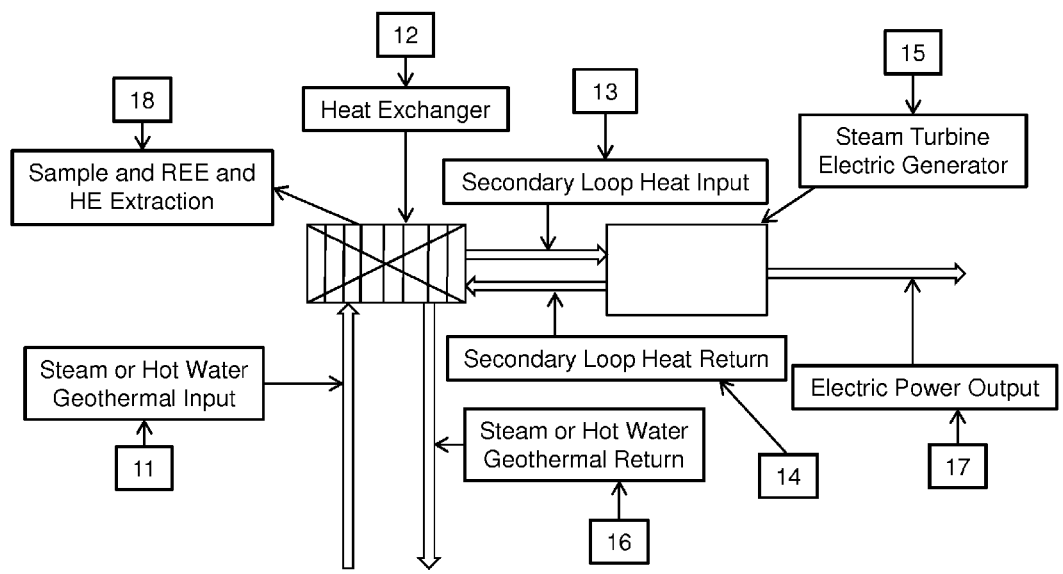
FIG. 2 is a schematic diagram of the components of the method and system for utilizing the geothermal hot water and steam flows and equipment to sample and extracts REEs and HEs from the steam generator in a geothermal electric generation plant.

In FIG. 2, geothermal fluid input 11 is the riser that brings the geothermal hot water or steam into the heat exchanger 12. Heat exchanger 12 passes the thermal energy into the secondary loop 13. The heat from secondary loop 13 is delivered into the steam turbine electric generator 15. Electric energy is then produced and provided by grid connect 17 to the electric grid. The secondary loop return 14 recycles the secondary steam back into heat exchanger 11 for reuse. Extraction unit 18 is the means by which REEs and HEs can be extracted from the heat exchanger for separation.

Figure 3:
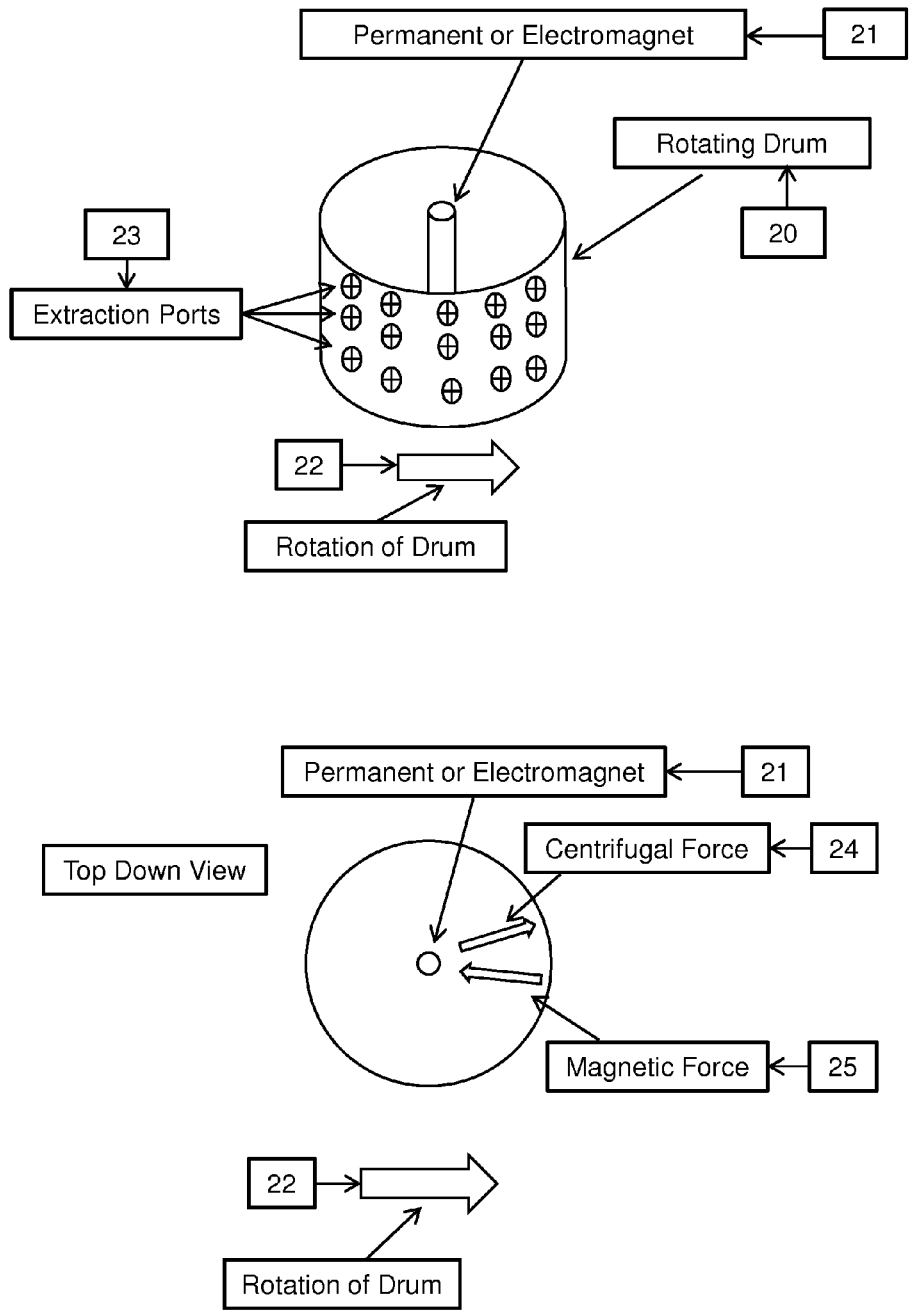
FIG. 3 is a schematic diagram of the components of the method and system for separating REEs from each other and HEs from each other utilizing magnets and centrifugal forces to enhance the efficiency of the separation.

In FIG. 3, an exemplary extraction unit 18 according to certain embodiments of the invention is shown. Condensate (or other fluid sample) is placed in rotating drum 20 with magnet 21 (e.g., permanently magnetized material or electromagnet) in its center which will be designed to extract naturally magnetic REEs and HEs (top view and side view). The rotations per minute ("RPM") of the centrifuge is modulated in order to modulate an applied centrifugal force to optimize recovery from the sample. An electromagnetic center core can be employed as magnet 21 in order to modulate both RPM and magnetism in order to optimize separation of paramagnetic REEs and HEs from the sample. The present invention improves on existing systems by balancing the centrifugal force of the rotating drum against the permanent or varying strength of the magnet.

In FIG. 3, rotating drum 20 is placed in a vertical position with magnet 21 preferably at the center of rotating drum 20. Rotation of drum 20 causes force 22 to be applied to components of the condensate. This force will push the heavier REEs and HEs to the outer rim of rotating drum 20. This force can be varied during the duration of time of rotation. Magnet 21 will attract the REEs and HEs in a manner consistent with each metal's paramagnetic properties. By varying the RPM of the drum rotation and varying the magnets power exerted by the magnet, separation of the REEs and HEs can be effectively and efficiently achieved. REEs that reach the outer rim of the drum can then be extracted through extraction ports 23.

In certain embodiments, a magnet on the inside of a centrifuge exerts a magnetic force on particles, the magnetic force being in a direction different than the centrifugal force. Preferably, the magnetic force is substantially opposite the centrifugal force, in that each is perpendicular to the axis of rotation, the magnetic force being in an inward direction and the centrifugal force being in an outward direction. A magnet can be fitted around or near the shaft of a centrifuge and where an electromagnet is used, power can be sent through a ring and brush assembly. Assembly of a magnet with a centrifuge is described in U.S. Pat. No. 5,593,378.

By these forces, one or more desired elements are physically segregated from other components of a hydrothermal fluid within extraction unit 18. The segregated elements can then be retrieved—i.e., removed from the vessel (and removed from the condensate). Thus it can be packaged, shipped, stored, sold, examined, or used. Sale of REEs extracted by these methods should supply a stream of revenue.

Another advantage of the present invention is that the dust, which is low density compared to the REEs and HEs, will be attracted to magnet 21 eliminating the need in solid extractions to be cleaned of dust which is very expensive and a major drawback of existing drawings and applications.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A method for extracting rare earth and heavy metal elements from hydrothermal products comprising:
   receiving geothermal fluid into a vessel of a heat exchanger operably coupled to an extraction unit by a conduit, the extraction unit comprising a magnet at least partially disposed within a rotatable drum having a substantially vertical axis of rotation and free space extending continuously in all radial directions from the magnet to an inside surface of the drum;
   collecting a condensate from the fluid;
   transferring the condensate to the extraction unit via the conduit;
   pushing rare earth and heavy metal elements to an outer rim of the drum while keeping one or more other components of the condensate on the magnet by rotating the drum to apply a centrifugal force and simultaneously using the magnet to apply a magnetic force to the condensate, thereby segregating the rare earth and heavy metal elements from the one or more other components of the condensate; and
   retrieving the rare earth and heavy metal elements from the extraction unit.

2. The method of claim 1 wherein the receiving step occurs at a geothermal electrical production facility.

3. The method of claim 1 wherein the magnetic force is applied by an electromagnet.

4. The method of claim 1 further wherein a duration of the centrifugal force and a duration of the magnetic force are different and overlap.

5. The method of claim 1 further comprising analyzing a sample of the geothermal fluid to identify the rare earth or heavy metal elements prior to applying the first or second force.

6. The method of claim 5 wherein the analyzing comprises assessing an optimal extraction method.

7. The method of claim 5 wherein the analyzing step comprises sending the sample through a measuring instrument and the measuring instrument is one selected from the list consisting of mass spectrometer and chromatograph device.

8. The method of claim 1 further comprising varying the centrifugal or the magnetic force over time.

9. The method of claim 1 wherein the rare earth and heavy metal elements comprise one selected from the list consisting of: heavy metal, rare earth element, lanthanide, and actinide.

10. The method of claim 1 further including using the fluid to heat a second fluid; using the second fluid to drive a turbine; and driving the turbine to generate electricity.

11. A process for separating rare earth elements from a geothermal fluid, the process comprising using an extraction system at a hydrothermal power plant, the extraction system comprising an extraction unit operably coupled to a heat exchanger by a conduit, to perform the steps of:

collecting a condensate from a geothermal fluid in a vessel of the heat exchanger;

transferring the condensate via the conduit into a rotatable drum within the extraction unit, the drum having a substantially vertical axis of rotation and an outer wall separated from a magnet disposed therein by continual free space in all radial directions from the axis;

applying a magnetic force to the condensate via the magnet while rotating the drum to apply a substantially horizontal centrifugal force to push rare earth elements to an outer rim of the drum while retaining other components of the condensate at a surface of the magnet; and retrieving the separated rare earth elements from the extraction unit.

12. The process of claim 11, wherein the conduit is a conveyor belt.

13. The process of claim 11, further comprising modulating the rotations per minute of the drum to optimize separation of the rare earth elements from the condensate.

14. The process of claim 11, wherein the magnet is an electromagnet and further comprising modulating the magnetism to optimize separation of the rare earth elements from the condensate.

\* \* \* \* \*